United States Patent [19]

Dressler et al.

[11] Patent Number: 5,188,316
[45] Date of Patent: Feb. 23, 1993

[54] AIRCRAFT AUTOTHROTTLE SYSTEM

[75] Inventors: Jim Dressler, Santa Ana; Bill Johnston, Santa Fe Springs; Gerald Loftis, Colton; Mark Salierno, Corona; Gordon Solt, Lake Elsinore; Jeff Spira, Huntington Beach; Manual Tarsha, Irvine, all of Calif.

[73] Assignee: Dover Corporation, Yorba Linda, Calif.

[21] Appl. No.: 814,594

[22] Filed: Dec. 30, 1991

[51] Int. Cl.$^5$ ............................................. B64C 13/04
[52] U.S. Cl. .................................... 244/234; 244/236; 192/41 R; 192/44
[58] Field of Search ............... 244/234, 236, 220, 221, 244/75 R; 74/470, 625, 110; 192/93 R, 41 R, 44

[56] References Cited

U.S. PATENT DOCUMENTS

| 1,399,038 | 12/1921 | Valois | 74/625 |
| 4,429,591 | 2/1984 | Zuch et al. | 74/625 |
| 4,567,786 | 2/1986 | Sakurai | 244/75 R |

Primary Examiner—Joseph F. Peters, Jr.
Assistant Examiner—Anne E. Bidwell
Attorney, Agent, or Firm—Edward A. Sokolski

[57] ABSTRACT

The throttle of an aircraft can be alternatively controlled either by a flight control computer or by the manual control of the pilot. A clutch is installed between the throttle control lever and a control input to the flight control computer which in the autothrottle mode of operation is engaged to enable control of the throttle by the flight control computer with the control lever being positioned in accordance with such control. When manual takeover of the throttle control is desired, a switch is actuated by the pilot which operates to disengage the clutch and thereby disconnects the control output of the computer from the lever so that only manual control is provided. A unique clutch mechanism is employed which utilizes a pair of locking wedges which operate in conjunction with a pair of rollers. The wedges and rollers are driven into engagement with each other by a solenoid, the opposing plates of the clutch being held in locking engagement through the intermediary provided by the wedges and rollers. Emergency "bump" disconnection of the clutch is effected by a pair of microswitches against which a cantilevered spring portion of the control lever abuts when the lever is "bumped", such switches operating to de-energize the solenoid and disengage the clutch.

4 Claims, 4 Drawing Sheets

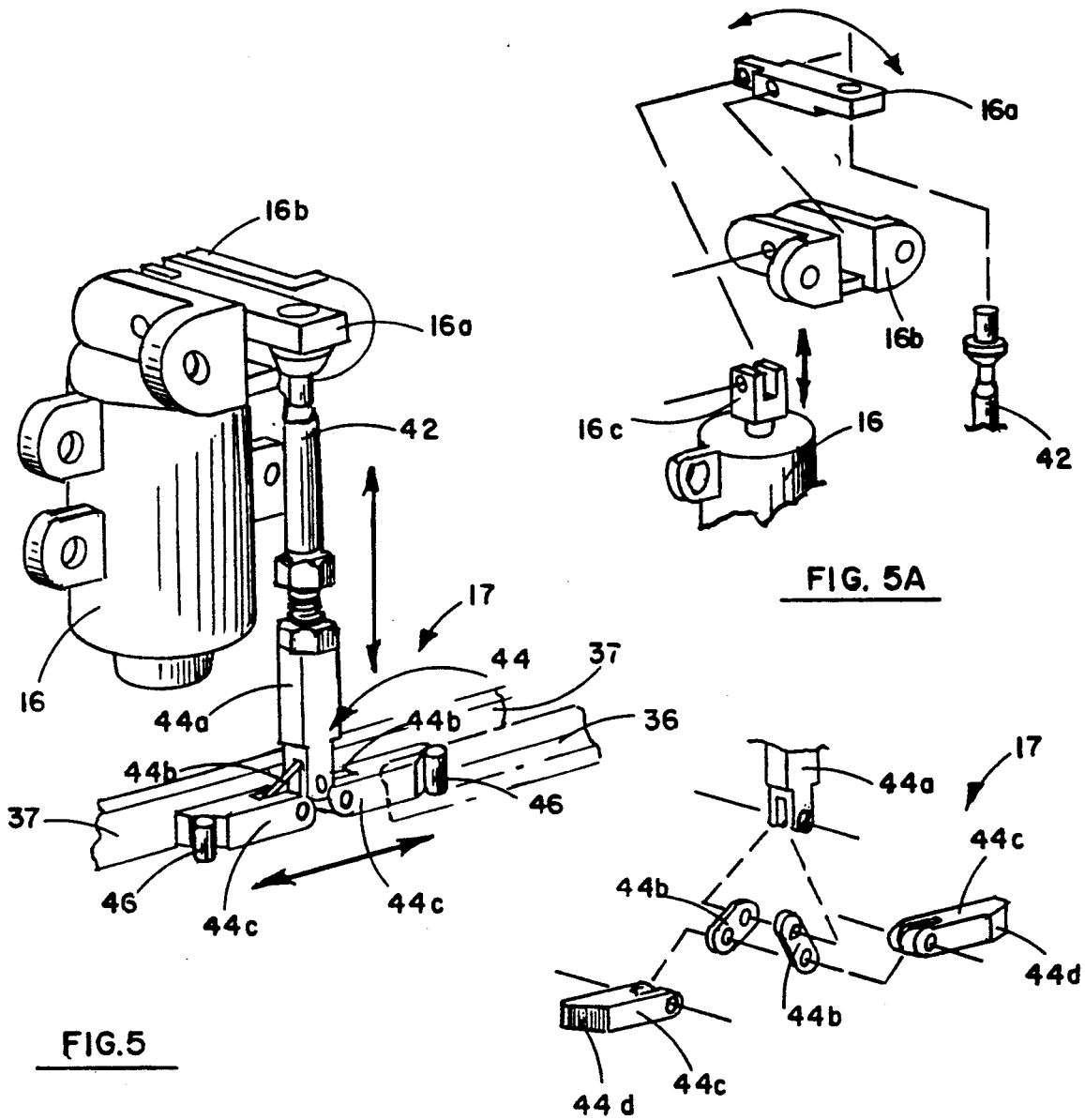

AIRCRAFT AUTOTHROTTLE SYSTEM

BACKGROUND OF THE INVENTION

1. Field of the Invention

This invention relates to aircraft autothrottle systems and more particularly to a clutch mechanism for enabling the rapid connection and disconnection of the automatic throttle control to and from the throttle control lever.

2. Description of the Related Art

Throttle control levers or quadrants are generally provided in aircraft for use by the pilot in manually controlling the engine power as well as attitude control mechanisms such as the aircraft flaps. In more sophisticated aircraft, such throttle control is integrated with the flight control system and under normal flight conditions controlled thereby. It is essential, however, that in the event of a malfunction or other emergency situation that the pilot be able to instantly and positively take over control of the throttle. In such takeover situations, the pilot must be able to fully take over the control of the aircraft from the flight control system and when so desired instantly restore such automatic control. In implementing such instant switchover of operation, it is essential that the manual control lever be coupled to the flight control system when the system is in automatic operation so that such lever assumes and maintains the proper setting for any future manual takeover.

Prior art autothrottle systems are described in U.S. Pat. No. 3,599,510 issued Aug. 17, 1971 to Scott and U.S. Pat. No. 4,651,954 issued Mar. 24, 1987 to Miller. Miller employs a D.C. stepping motor in controlling the throttle system which is coupled to the throttle actuator through a drum type friction clutch pack. In Scott, the clutch between the control lever and the automatic control system employs a clutch having friction shoes. Neither of these references suggests a clutch mechanism employing a combination of wedge and roller elements such as that of applicant's system which is of simple and reliable construction and which provides positive clutch engagement and disengagement in response to a switch actuated solenoid.

SUMMARY OF THE INVENTION

The present invention provides a system in which automatic operation of the throttle or manual operation thereof can alternatively be obtained in a simple and rapid manner by means of a unique clutch mechanism. This clutch mechanism is formed by a pair of wedge members which operate in conjunction with a pair of locking rollers to form a positive lock between two opposing plates which form the couplings for the units to be interconnected by the clutch. To interconnect the clutch plates, a solenoid is actuated, this solenoid having a toggle mechanism which drives the wedges against the rollers to effect a positive lock between the wedges, rollers and the two clutch plates, against which the wedges and rollers are respectively driven. When the solenoid is deactuated, the solenoid toggle is returned to its initial position by spring action, releasing the pressure on the wedges thereby releasing the wedges, rollers and plates from their interlocked relationship.

The solenoid is manually actuated and deactuated by means of a switch on the control lever and in emergencies can be deactuated by sharp "bump" movement of the lever which causes the lever to itself actuate a microswitch which controls the solenoid.

It is therefore an object of this invention to facilitate the switchover between manual and automatic control of an aircraft throttle.

It is a further object of this invention to provide an improved clutch mechanism for use in the throttle control system of an aircraft.

Other objects of the invention will become apparent from the following description in connection with the accompanying drawings.

BRIEF DESCRIPTION OF THE DRAWINGS

FIGS. 5, 5A, and 5B are perspective schematic drawings illustrating the clutch mechanism of the preferred embodiment of the invention.

DETAILED DESCRIPTION OF THE INVENTION

Figure 1:
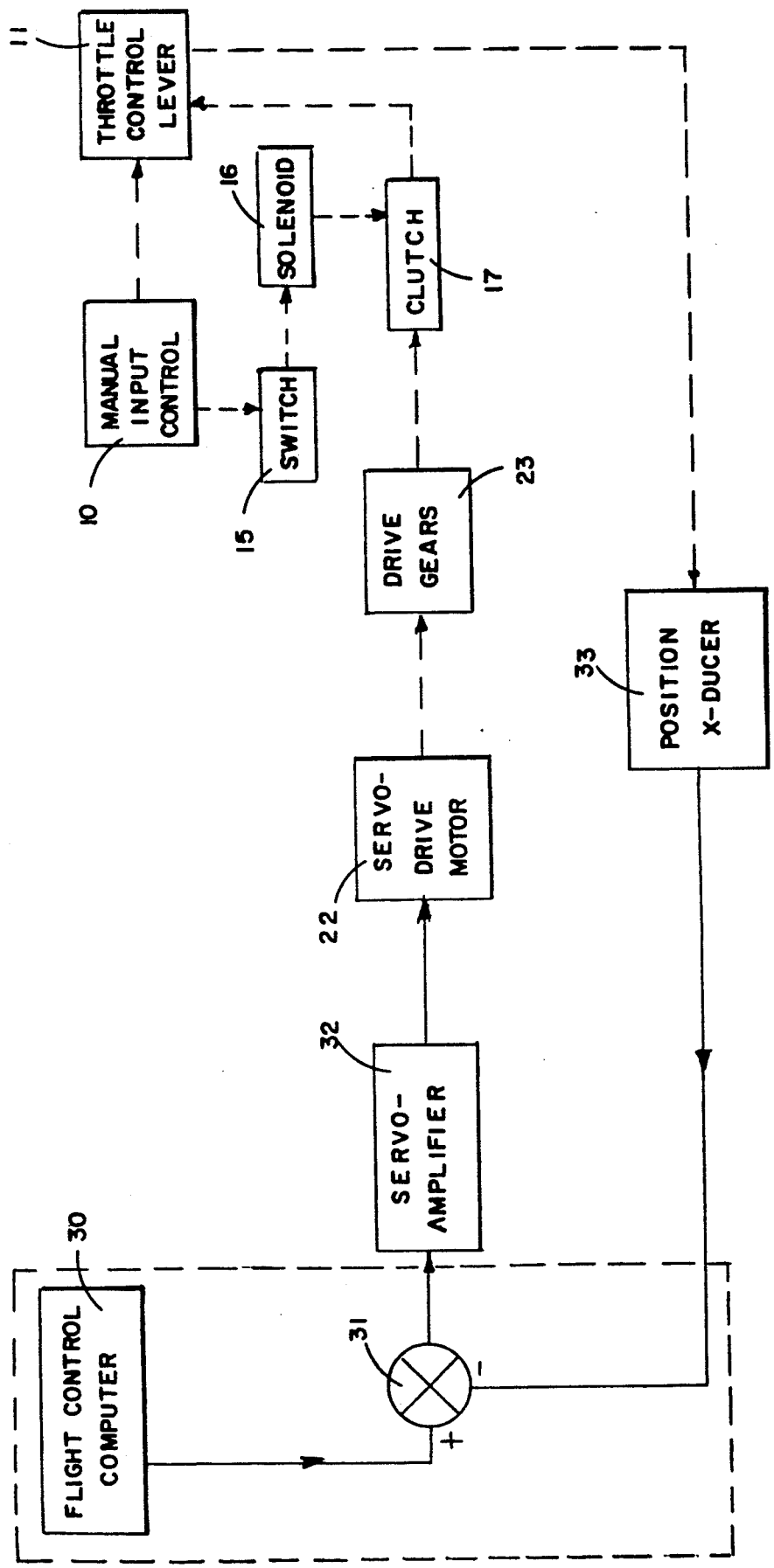
FIG. 1 is a functional block diagram illustrating the system of the invention.

Referring to FIG. 1, the system of the invention is illustrated in a functional block diagram. In initiating the manual mode of operation, the pilot(manual input control 10) momentarily actuates switch 15 which operates to deactuate solenoid 16 which in turn operates to release clutch 17 to disengage throttle control lever 11 from drive gears 23. Drive gears 23 receive the automatic flight control input from flight control computer 30 through servo amplifier 32 and servo drive motor 22, and thus this automatic control input is disconnected with clutch 17 disengaged during the manual control mode of operation.

During the manual mode of operation, the mechanical input to throttle control lever 11 provided by the pilot is fed directly to the control for the throttle with the output of the flight control computer being disconnected from the throttle control lever, as described above.

When automatic throttle control is desired, the pilot momentarily actuates switch 15 which on such actuation operates to activate solenoid 16. In its activated condition, solenoid 16 operates to cause clutch 17 to engage thereby connecting the output of drive gears 23 to the throttle control lever. Drive gears 23 are driven in response to a throttle control signal from flight control computer 30.

The throttle control signal is fed from flight control computer 30 to summing device 31. A signal representing the position of throttle control lever 11, as generated by position transducer 33, which includes gear train 18 and servo control 19 (See FIG. 3) is fed to summing device 31 for comparison with the throttle control signal from the computer. The output of summing device 31 which is an "error" signal representing the differential between the inputs fed thereto is fed to servo amplifier 32 which provides a drive signal for servo drive motor 22. The mechanical output of motor 22 drives gears 23 which in turn are connected to the throttle control lever 11 through clutch 17. The position of the throttle control lever and the control of the throttle is thus effected in response to the throttle control signal generated in flight control computer 30.

Figure 2:
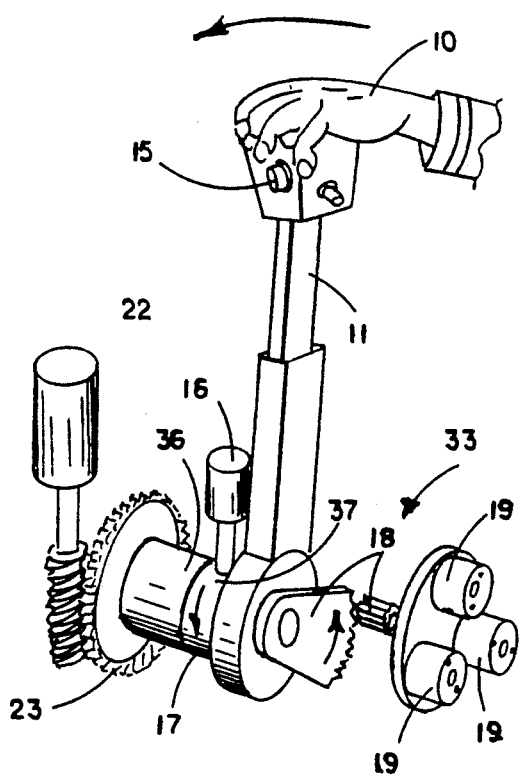
FIG. 2 is a perspective schematic drawing illustrating the control lever and associated parts with the clutch mechanism of the invention released for manual operation of the control lever.

Referring now to FIG. 2, the operation of the system of the invention in its manual mode is illustrated. To obtain such manual operation the pilot must first momentarily actuate switch 15, which is a type of switch which closes and opens successively in response to successive actuations. Assuming the clutch had previously been engaged and the flight control computer in command, such an actuation of switch 15 will disengage clutch 17 by virtue of the actuation of solenoid 16 to allow plate 37 to move independently of plate 36. Thus, the output of servo drive motor 22 will no longer have any effect in driving lever 11, and the lever will independently control the throttle in response to positioning by the pilot.

Figure 3:
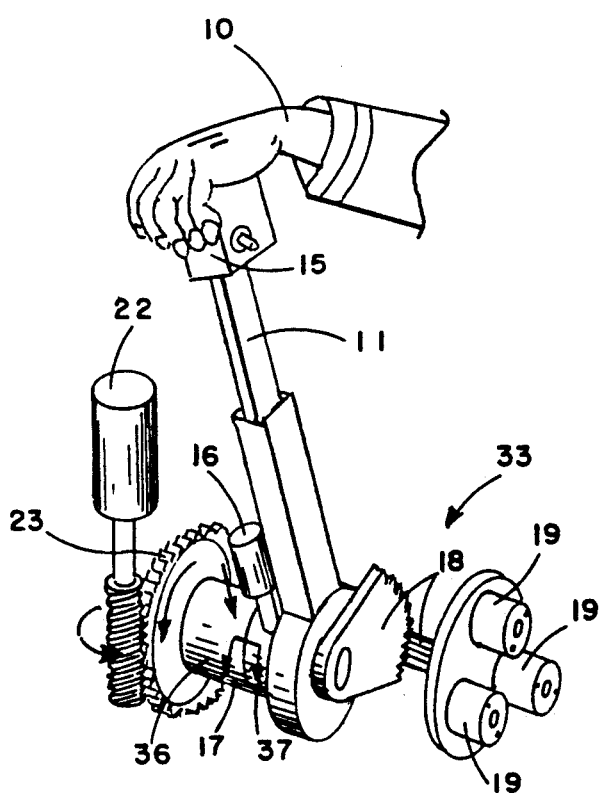
FIG. 3 is a perspective schematic drawing illustrating the control lever and associated parts with the clutch just having been actuated for automatic control of the lever.

Referring now to FIG. 3, the operation of the system in its automatic control mode is illustrated. To initiate automatic operation, the pilot momentarily actuates switch 15. When this occurs, clutch 17 is engaged by virtue of the actuation of solenoid 16 connecting plate 36 to plate 37. Thus, the output of servo drive motor 22, which as explained in connection with FIG. 1, is a function of the output of the flight control computer 30, controls the position of lever 11 through drive gears 23. A signal in accordance with the throttle position is generated by position transducer 33 which comprises gear train 18 connected to the throttle and servo control 19 which is driven by the gear train. Servo control 19 may comprise potentiometers. The operation of the position transducer is conjunction with the flight control computer has already been described in connection with FIG. 1.

Figure 4A:
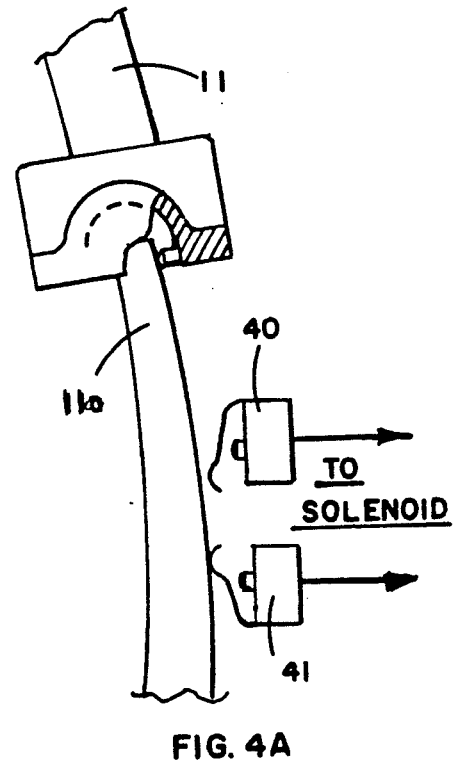
FIGS. 4A and 4B are elevational schematic drawings illustrating the operation of the microswitches to effect release of the clutch in response to a "bump" actuation of the control lever.
Figure 4B:
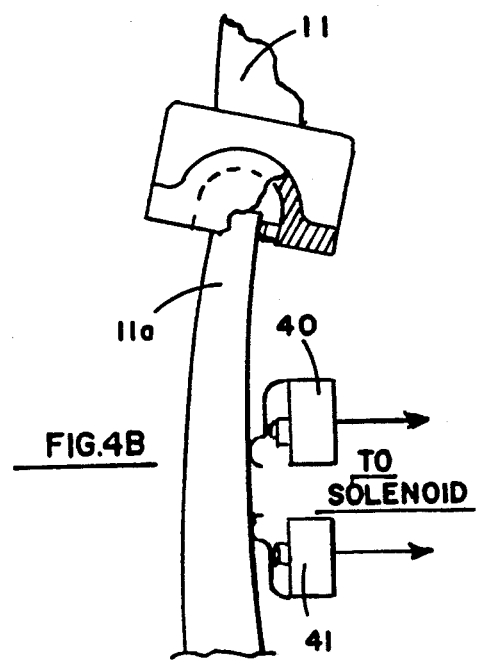

Referring now to FIGS. 4A and 4B, the operation of the device of the invention in response to a "bump" or sharp actuation of the control lever by pilot is illustrated. This type of operation would be used in an emergency situation where the pilot needs to rapidly take over the throttle from the flight control computer. Throttle control lever 11 has a portion thereof 11a which is a stiff cantilevered spring. Positioned adjacent to spring portion 11a are a pair of microswitches 40 and 41. Switch 40 when activated is normally open while switch 41 when unactuated is normally closed. With lever portion 11a in its neutral fully upright position, switch 41 is actuated so that it is in its "open" position while switch 40 is not actuated so that it is also "open". Switches 40 and 41 are connected in parallel with each other and in parallel with the actuation switch 15 for solenoid 16 so that when either switch is "closed," the solenoid is actuated. With the lever in its neutral, fully upright position, switch 40 is not actuated ("open") and switch 41 is actuated ("open") providing no actuation of the solenoid. With a forward "bump" by the pilot, as shown in FIG. 4A, both switches will be unactuated, an actuation of the solenoid being provided through normally closed switch 41. With a rearward "bump" by the pilot, as shown in FIG. 4B, both switches will be actuated, the solenoid being actuated by normally open switch 40. In an extreme emergency situation where the pilot is unable to disconnect the automatic control either by manually actuating switch 15 or by the "bump" operation just described, the clutch will still release in response to forces greater than the bump disconnect force which forces are within the normal capability of the pilot.

Referring now to FIGS. 5, 5A, and 5B, the clutch mechanism of the preferred embodiment of the invention is illustrated. Solenoid 16 has an actuator arm 16a which is drawn downwardly when the solenoid is actuated. As can best be seen in FIG. 5A, arm 16a is supported for pivotal motion in bracket 16b which is attached to the top of the solenoid and is pivotally supported in U-shaped bracket 16c which is also attached to the top of the solenoid. Connected to arm 16a is a shaft 42 which in turn is connected to toggle mechanism 44. This toggle mechanism has a top arm 44a, there being a pair of tab members 44b pivotally connected to the bottom end of this arm. Pivotally supported on each of tab members 44b is an arm member 44c having a wedge shaped end portion 44d. A cylindrical roller 46 is mounted adjacent to each of the wedge shaped end portions, such rollers being urged in the direction of the wedges by springs, as to be explained in connection with FIGS. 6A-6D.

When solenoid 16 is actuated, its arm drives the top portion 44a of the toggle downwardly which in turn causes arm members 44c to be forced outwardly away from each other so that their wedge shaped ends drive against rollers 46. This forcing action locks rollers 46 against clutch plate 36 and the surfaces of arms 44c against clutch plate 37. When the solenoid is deactuated, arm 11a is driven upwardly by virtue of the action of a spring(not shown) in the solenoid mechanism. The toggle is thereby lifted upwardly which draws arms 44c inwardly to release the force on the rollers and thus releases the clutch.

Figure 6A:
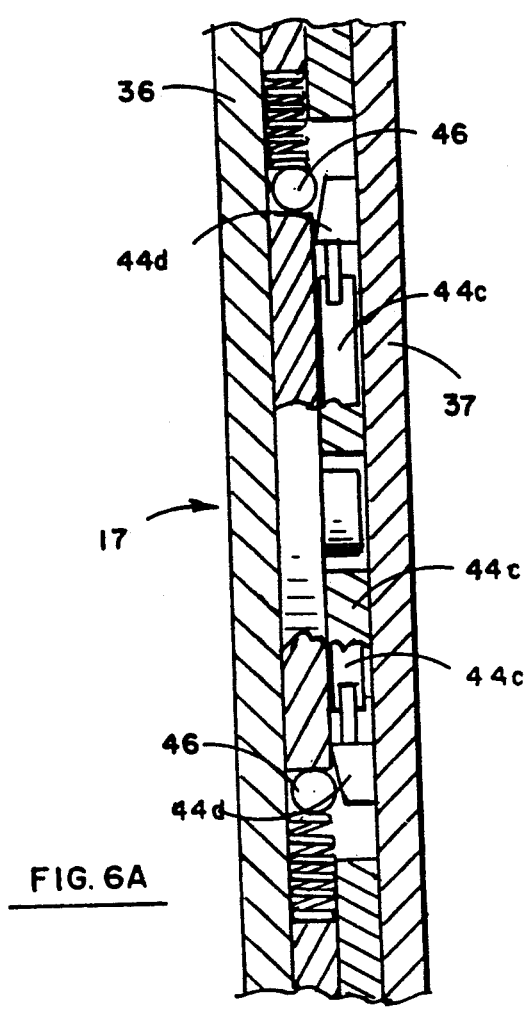
FIGS. 6A and 6B are a series of sectional schematic elevational drawings illustrating the operation of the clutch mechanism of the invention.
Figure 6B:
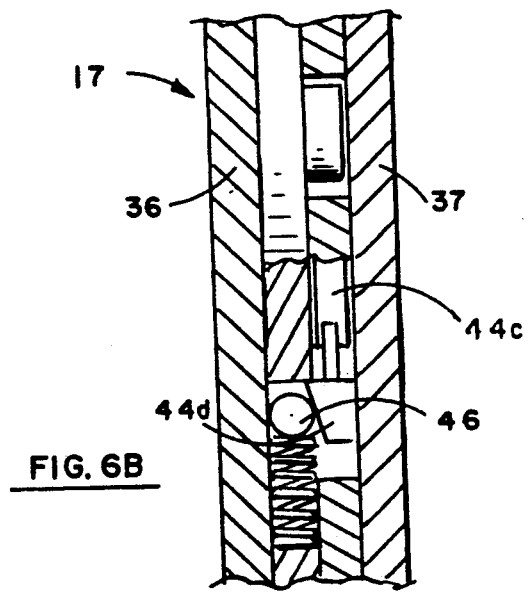

Referring now to FIGS. 6A and 6B, the operation of the clutch mechanism of the invention is illustrated. FIG. 6A shows the clutch in the disengaged condition. As can be seen, the arms 44c of the toggle mechanism are not being forced outwardly and do not drive against the rollers 46. FIG. 6B shows the clutch in the engaged condition with arms 44c being outwardly and with the wedges shaped ends of such arms forcing against rollers 46.

While the invention has been described and illustrated in detail, it is to be clearly understood that this is intended by way of illustration and example only and is not to be taken by way of limitation, the scope of the invention being limited only by the terms of the following claims:

I claim:

1. In a throttle control system for an aircraft having a throttle control lever and automatic control means for automatically controlling the positioning of said lever wherein the improvement comprises means for alternatively connecting said lever to said automatic control means for control of the throttle thereby or disconnecting said lever from said automatic control means to enably manual control of said lever comprising:

a first plate member connected to said control lever,
   a second plate member connected to said automatic control means,
   a clutch mechanism for alternatively either connecting said first and second plate members together or disconnecting said plate members from each other, said clutch mechanism including wedge member means having a surface which abuts against one of said plate members, roller member means which abuts against the other of said plate members, said wedge member means having a wedge shaped surface positioned directly opposite said roller member means, and means responsive to manual actuation for alternatively engaging or disengaging said clutch mechanism by driving said wedge member means, said roller member means and said first and second plate members into locking engagement with each other to interconnect the control lever and the automatic control means or releasing the driving of said plate members and said wedge and roller member means from locking engagement thereby disconnecting the control lever from said automatic control means to permit manual control thereof.

2. The throttle control system of claim 1 wherein said means for alternatively engaging or disengaging said clutch mechanism comprises a solenoid, and manually actuated switch means for actuating and deactuating said solenoid.

3. The throttle control system of claim 2 wherein said solenoid includes a toggle mechanism which is driven thereby to drive said wedge and roller members into locking engagement.

4. The throttle control system of claim 2 wherein said control lever has a cantilevered spring portion and further including switch means adjacent to said cantilevered portion, said switch means operating said solenoid in response to bending movement of said cantilevered portion in response to "bump" actuation of said lever.

* * * * *